(12) United States Patent
Tan

(10) Patent No.: US 6,439,585 B1
(45) Date of Patent: Aug. 27, 2002

(54) GOLF BAG CARRIER

(76) Inventor: Fu-Hsing Tan, 4th Fl., 101-1, Chi Lin Road, Yang Chou Tsun, Lu Chu, Taoyuan Hsien (TW)

( * ) Notice: Subject to any disclaimer, the term of this patent is extended or adjusted under 35 U.S.C. 154(b) by 48 days.

(21) Appl. No.: 09/739,865

(22) Filed: Dec. 20, 2000

(51) Int. Cl.$^7$ ............................... B62B 1/12; B62B 1/14
(52) U.S. Cl. ............................... 280/47.26; 280/47.35; 280/79.6
(58) Field of Search ........................ 280/47.26, DIG. 6, 280/47.27, 47.29, 47.18, 47.19, 47.34, 47.35, 35, 37, 651, 79.5, 79.6; 248/96, 97, 98, 95, 124.2, 138, 354.1; 206/315.3, 315.7, 579

(56) References Cited

U.S. PATENT DOCUMENTS

| | | | | |
|---|---|---|---|---|
| 1,231,030 A | * | 6/1917 | Kelley | 206/315.7 |
| 1,617,115 A | * | 2/1927 | Hotze | 206/315.4 |
| 2,367,234 A | * | 1/1945 | Mitchell | 206/315.2 |
| 2,405,674 A | * | 8/1946 | Schliwa et al. | 280/13 |
| 2,552,501 A | * | 5/1951 | Wilkens | 206/315.4 |
| 2,667,320 A | * | 1/1954 | Whitley | 248/129 |
| 4,012,051 A | * | 3/1977 | Embinder | 280/47.19 |
| 4,063,581 A | * | 12/1977 | Williams | 190/18 A |
| 4,650,200 A | * | 3/1987 | Berfield et al. | 248/154 |
| 5,029,883 A | * | 7/1991 | Derito | 280/35 |
| 5,209,350 A | * | 5/1993 | Maeng | 206/315.7 |
| 5,515,897 A | * | 5/1996 | Fehan | 150/159 |
| 5,599,037 A | * | 2/1997 | Spickler | 280/43.1 |
| 6,000,712 A | * | 12/1999 | Wu | 280/47.34 |
| 6,039,243 A | * | 3/2000 | Lickton | 206/335 |
| 6,131,925 A | * | 10/2000 | Weldon | 280/30 |
| 6,164,425 A | * | 12/2000 | Latshaw | 190/108 |
| RE37,350 E | * | 9/2001 | Stephan | 280/79.5 |
| 6,315,310 B1 | * | 11/2001 | Hurt | 280/79.5 |
| 6,330,944 B1 | * | 12/2001 | DeMichele | 206/278 |

* cited by examiner

Primary Examiner—Brian L. Johnson
Assistant Examiner—Bridget Avery
(74) Attorney, Agent, or Firm—Troxell Law Office PLLC

(57) ABSTRACT

A golf bag carrier includes a base equipped with four bottom wheels and two side wheels, the base having a horizontal top block longitudinally disposed at a top side thereof on the middle for the positioning of a golf bag, the horizontal top block having two longitudinally aligned sliding slots, two clamping plates respectively mounted in the base and adapted to hold down a golf bag on the horizontal top block, the clamping plates each having a shaft respectively inserted through the sliding slots, and a control device controlled to move the clamping plates along the sliding slots relative to each other.

6 Claims, 13 Drawing Sheets

GOLF BAG CARRIER

BACKGROUND OF THE INVENTION

The present invention relates to golf bag carriers and, more particularly, to such a golf bag carrier, which has adjustable holding down means adapted to hold down the loaded golf bag.

Various golf bag carriers have been disclosed, and have appeared on the market. These golf bag carriers commonly comprise a wheeled base, and a covered fastened to the wheeled base and defining with the wheeled base an enclosed space for holding a golf bag and the attached golf clubs and other accessories. However, these golf bag carriers cannot be moved on the floor in vertical when carrying a golf bag and the attached golf clubs because they have no means to hold down the loaded golf bag on the wheeled base in vertical.

SUMMARY OF THE INVENTION

The present invention has been accomplished under the circumstances in view. It is the main object of the present invention to provide a golf bag carrier, which has means to hold down the loaded golf bag in vertical, and can be moved on the floor in vertical. It is another object of the present invention to provide a golf bag carrier, which fits different sizes of golf bags. According to one aspect of the present invention, the golf bag carrier comprises a base, the base having a horizontal top block longitudinally disposed at a top side thereof on the middle for the positioning of a golf bag, the horizontal top block having two longitudinally aligned sliding slots, two clamping plates respectively mounted in the base and adapted to hold down a golf bag on the horizontal top block, the clamping plates each having a shaft respectively inserted through the sliding slots, and a control device controlled to move the clamping plates along the sliding slots relative to each other. According to another aspect of the present invention, the base is equipped with four bottom wheels for enabling the golf bag carrier to be moved on the floor in vertical, and two side wheels for enabling the golf bag carrier to be moved on the floor in a tilted position.

DETAILED DESCRIPTION OF THE PREFERRED EMBODIMENT

Figure 1:
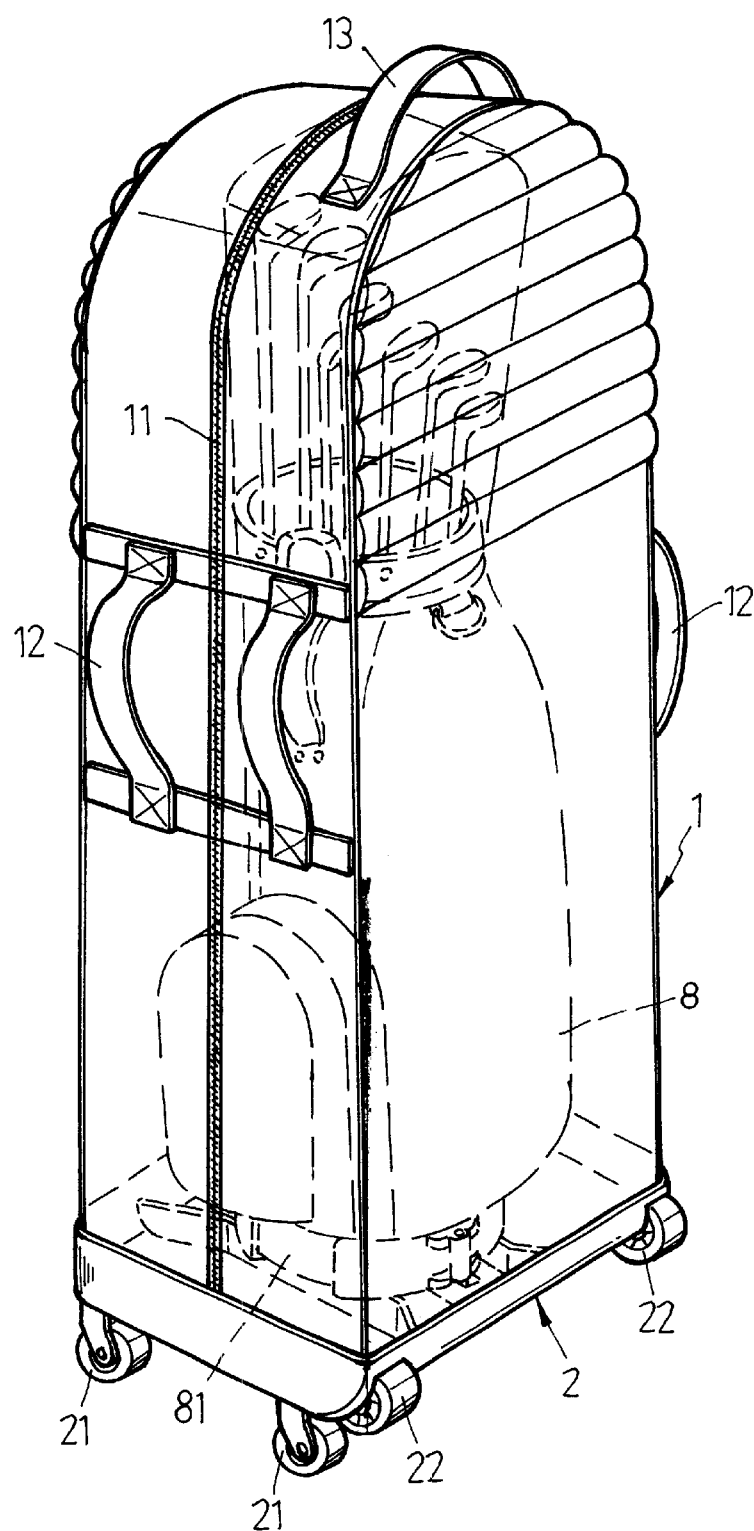
FIG. 1 is a perspective view of a golf bag carrier according to the present invention.
Figure 2:
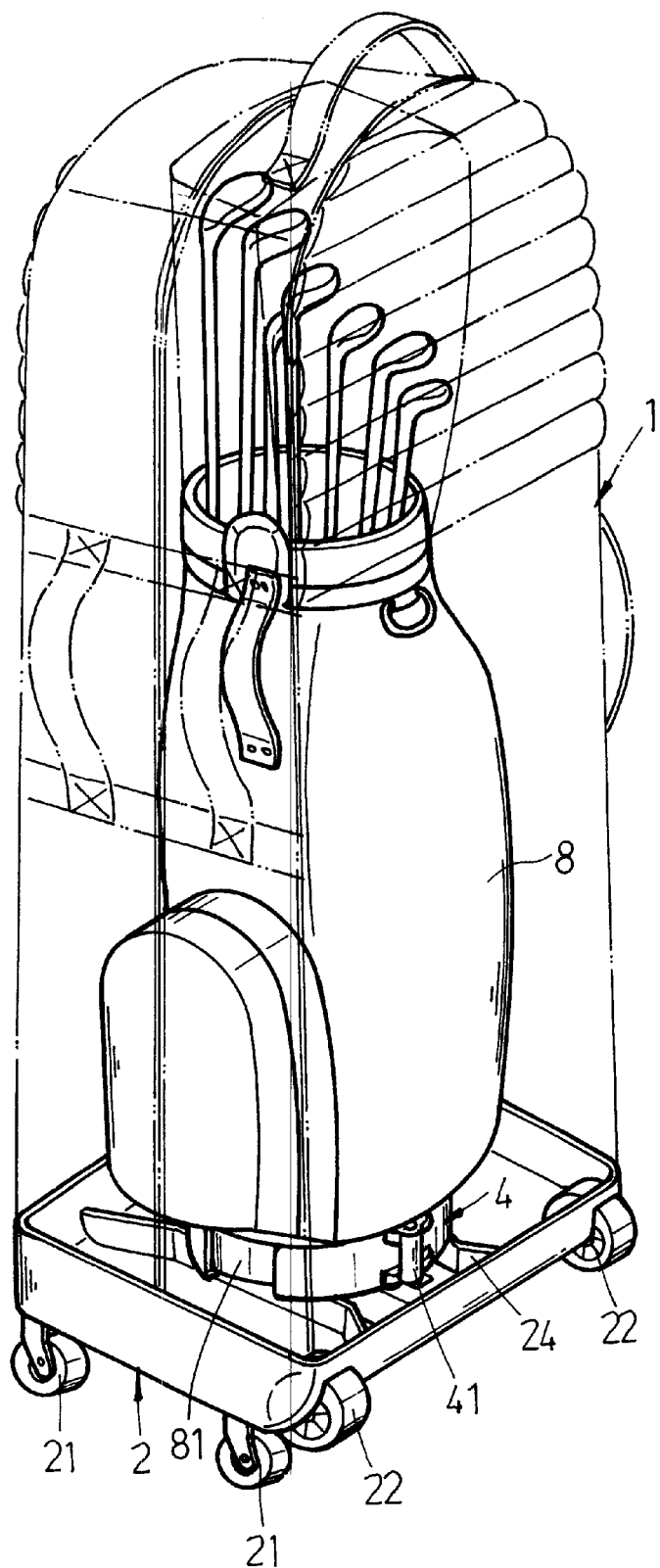
FIG. 2 is a perspective view of the present invention, showing the bottom cuff of the golf bag secured to the horizontal top block of the base.
Figure 15:
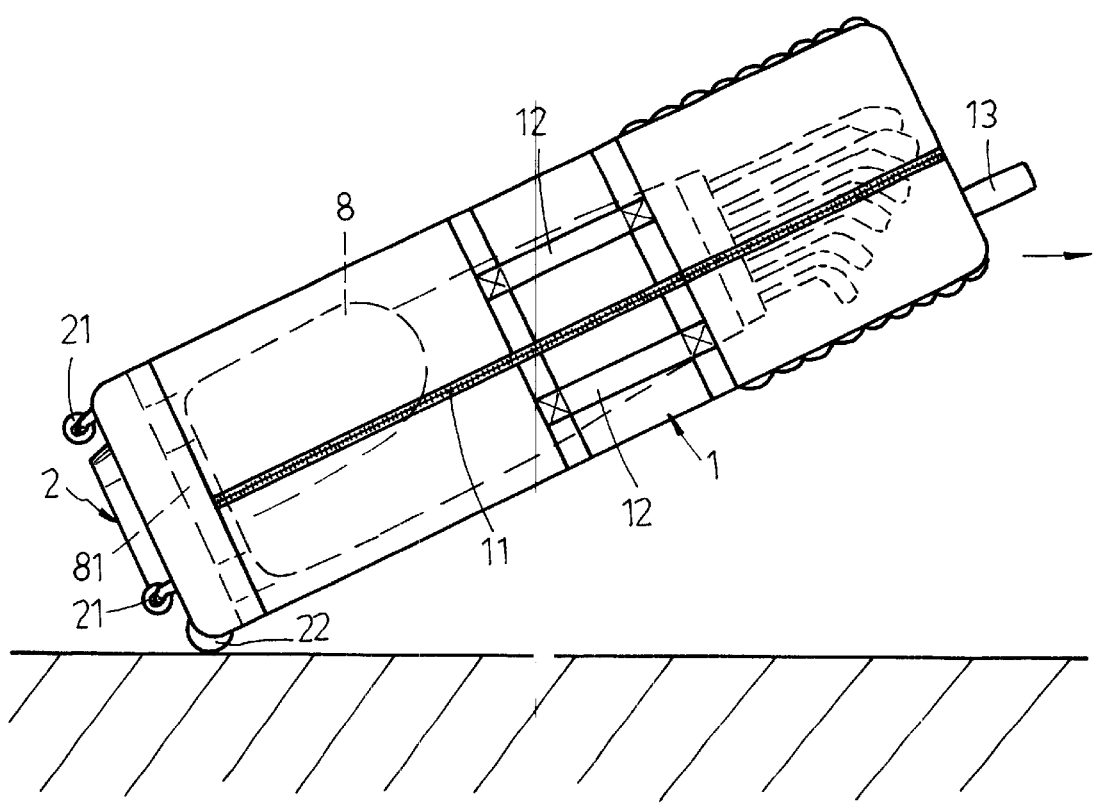
FIG. 15 shows the golf bag carrier moved on the floor in a tilted position.

Referring to FIGS. 1 and 2, a golf bag carrier 1 is shown comprising a base 2, and a covering 1 fastened to the base 2 and defining with the base 2 an enclosed space adapted to receive a golf bag and a set of golf clubs in the golf bag. The covering 1 comprises a zipper 11, which closes/opens the exit to the enclosed space, two side handles 12, and a top handle 13. The base 2 is equipped with four bottom wheels 21 and two side wheels 22, comprising a horizontal top block 23 longitudinally disposed at the topside thereof on the middle for the positioning of the bottom cuff 81 of a golf bag 8. By means of the bottom wheels 21, the golf bag carrier 1 is stably supported on the floor and, can be moved on the floor in vertical. By means of the side wheels 22, the golf bag carrier 1 can be moved on the floor in a tilted position (see FIG. 15).

Figure 3:
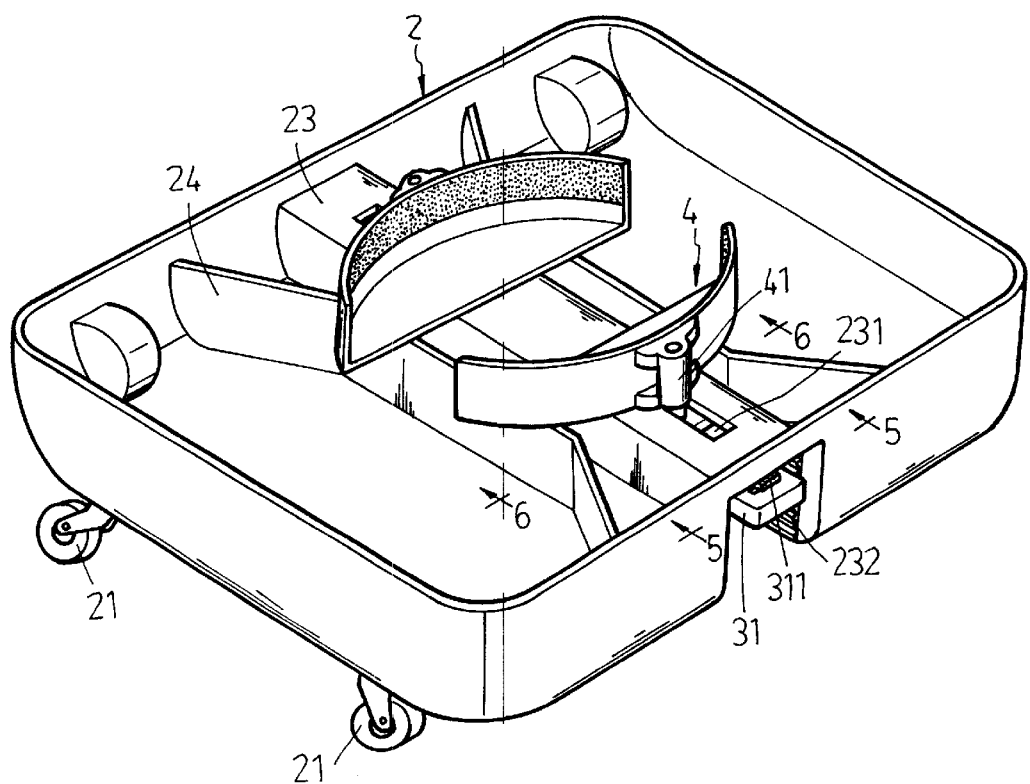
FIG. 3 is a perspective view of a part of the present invention, showing the clamping plates mounted in the sliding slots of the horizontal top block of said base.
Figure 4:
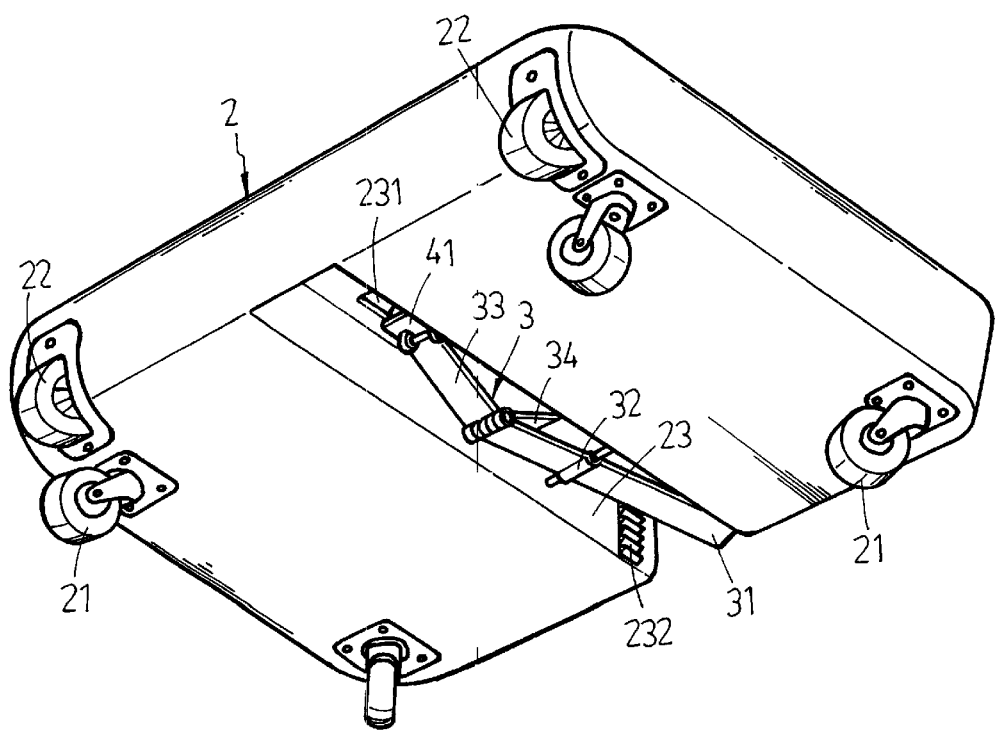
FIG. 4 is an oblique bottom view in perspective of FIG. 3.
Figure 5:
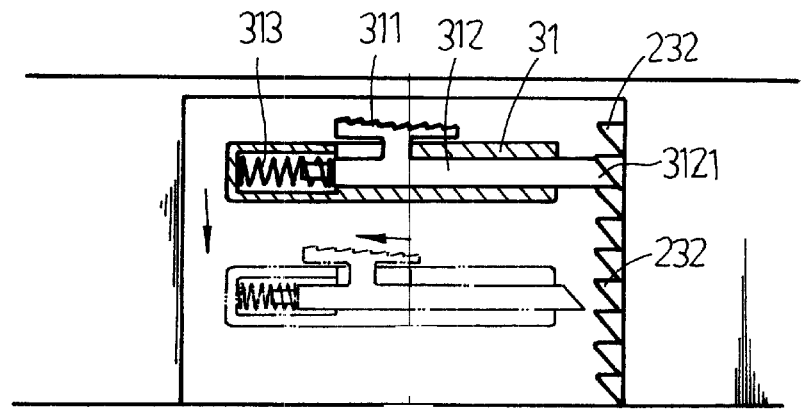
FIG. 5 is a schematic drawing showing the locking rod of the control device of the first embodiment of the present invention moved between the locking position and the unlocking position.
Figure 6:
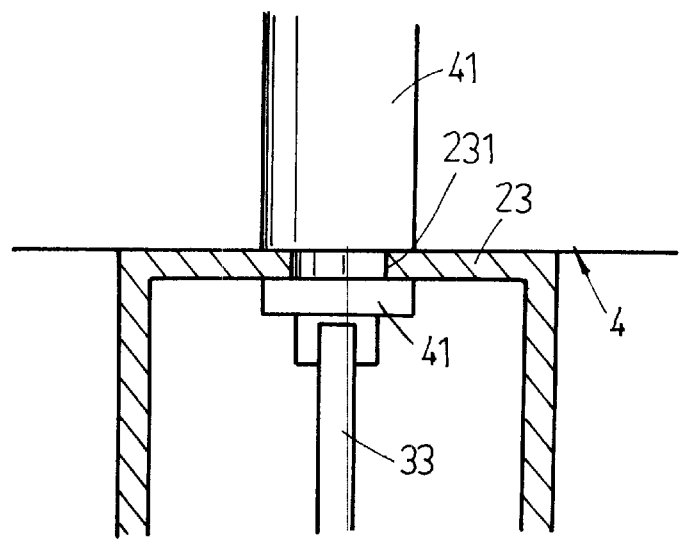
FIG. 6 is a sectional view in an enlarged scale taken along line 6—6 of FIG. 3.

Referring to FIGS. 3 and 4, the base 2 further comprises two pairs of struts 24 bilaterally symmetrically connected between two opposite vertical sidewalls thereof and the horizontal top block 23. The horizontal top block 23 is a hollow member, having two longitudinal sliding slots 231 disposed near two ends and longitudinally aligned on the middle. Two clamping plates 4 are respectively slidably mounted in the longitudinal sliding slots 231, and adapted to hold down the bottom cuff 81 of the loaded golf bag 8. The clamping plates 4 each have a shaft 41 respectively inserted through the sliding slots 231.

Referring to FIGS. from 3 through 6 and FIG. 2 again, the clamping plates 4 are smoothly arched members fitting the periphery of the bottom cuff 81 of the golf bag 8. After loading of the golf bag 8, the clamping plates 4 are moved toward each other and pressed on the bottom cuff 81 of the golf bag 8 at two sides to hold the golf bag 8 in place. A control device 3 is installed in the base 2, and controlled to move the clamping plates 4 toward or apart from each other between the operative position and the non-operative position. The control device 3 comprises a lever 31, two actuating bars 33 and 34, and a spring 35. The lever 31 is turned about a transverse pivot 32 below the horizontal top block 23, having an outer end, namely, the power end disposed outside the base 2 for operation by hand, and an inner end, namely, the weight end pivoted to the actuating bars 33 and 34. The actuating bars 33 and 34 each have one end respectively pivoted to the weight end of the lever 31, and an opposite end pivoted to the shaft 41 of one clamping plate 4. The spring 35 is connected between pivot shafts 41 of the clamping plates 4 to pull the clamping plates 4 toward each other. A locking rod 312 is slidably mounted in the lever 31, having one end supported on a spring 313 inside the lever 31 and an opposite end terminating in a tooth 3121 adapted to engage a rack 232 inside the horizontal top block 23. A knob 311 is fixedly connected to the locking rod 3121 and disposed outside the lever 31 for operation. The spring 313 forces the locking rod 312 into engagement with the rack 232 to lock the lever 31. The knob 311 can be pushed with the hand to disengage the locking rod 312 from the rack 232, for enabling the lever 31 to be turned about the transverse pivot 32 to move the actuating rods 33 and 34 and the clamping plates 4.

Figure 7:
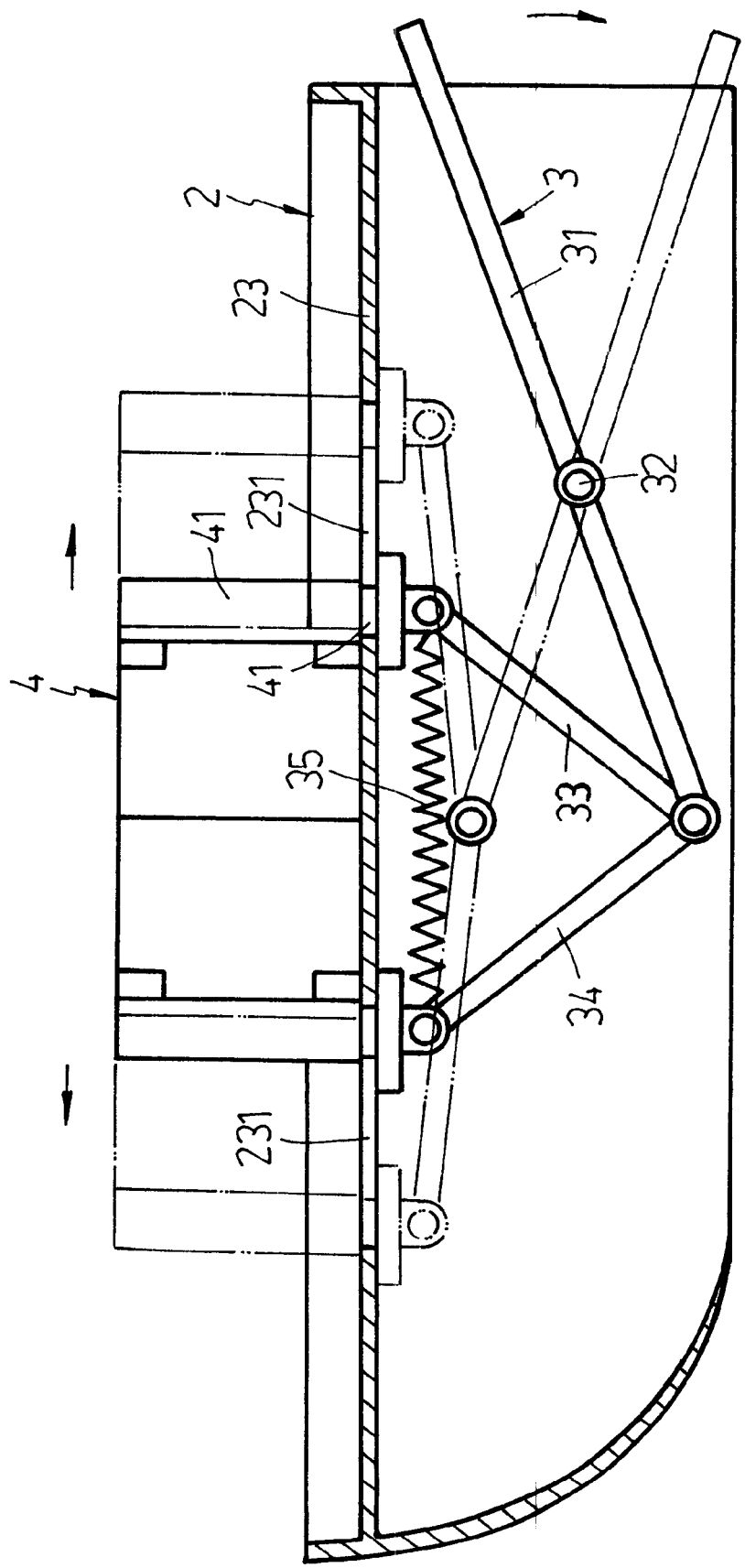
FIG. 7 is a sectional view showing the lever of the control device of the first embodiment of the present invention turned between two positions.

Referring to FIG. 7 and FIG. 3 again, when pushing the knob 311 with the thumb to disengage the locking rod 312 from the rack 232, the lever 31 is turned about the transverse pivot 32 in clockwise direction to open the actuating rods 33 and 34 outwards, thereby causing the actuating rods 33 and 34 to move the clamping plates 4 apart from each other. When turning the lever 31 about the transverse pivot 32 in counter-clockwise direction to close the actuating rods 33 and 34, it is not necessary to move the knob 311, and the tooth 3121 of the locking rod 312 is moved along the rack 232. When turning the lever 31 counter-clockwise, the spring 35 is stretched. When the user releases the hand from the lever 31, the spring 35 is returned to its former shape to pull the clamping plates 41 toward each other.

Figure 8:
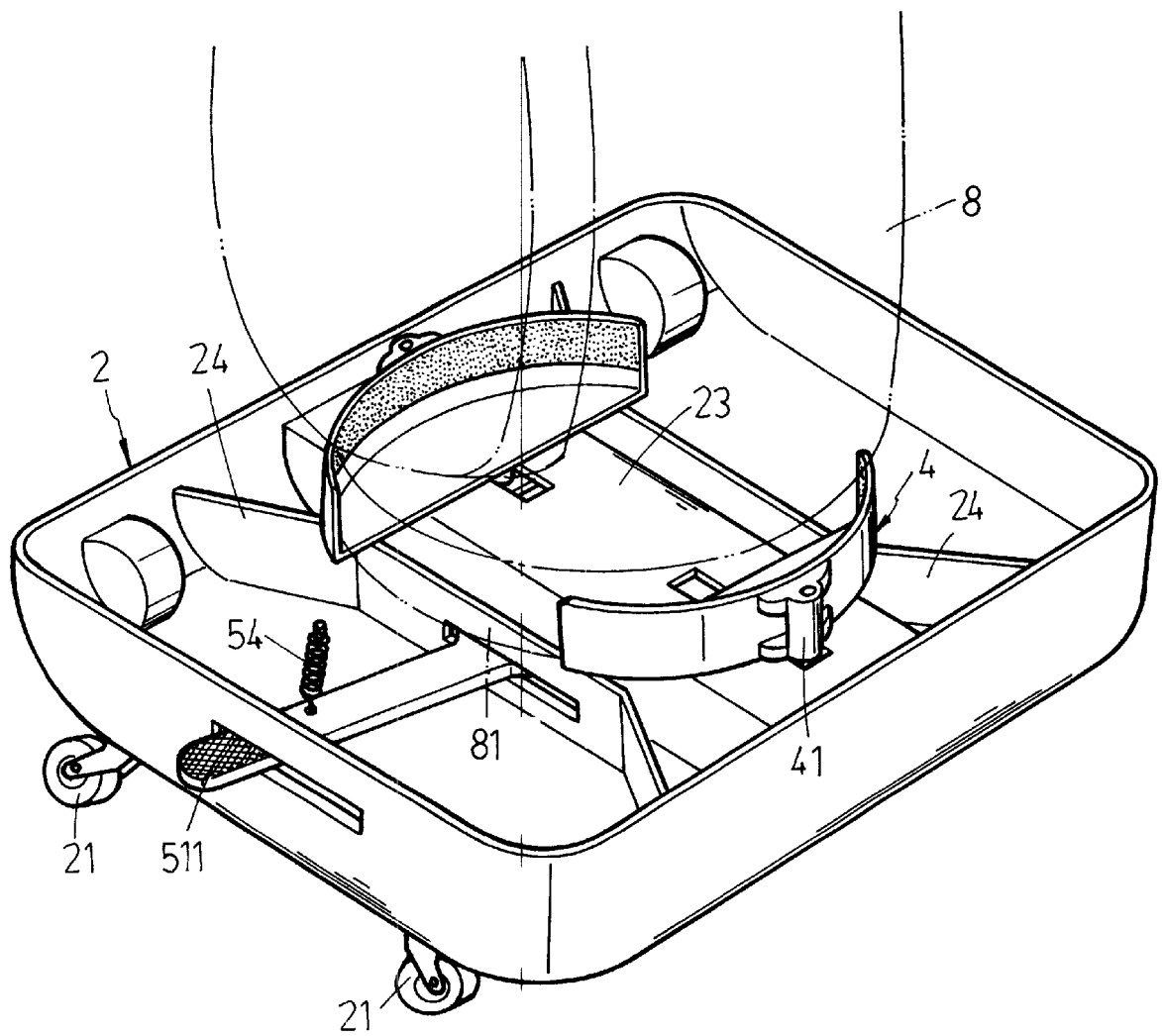
FIG. 8 is a perspective view showing the control device installed in the base according to a second embodiment of the present invention.
Figure 9:
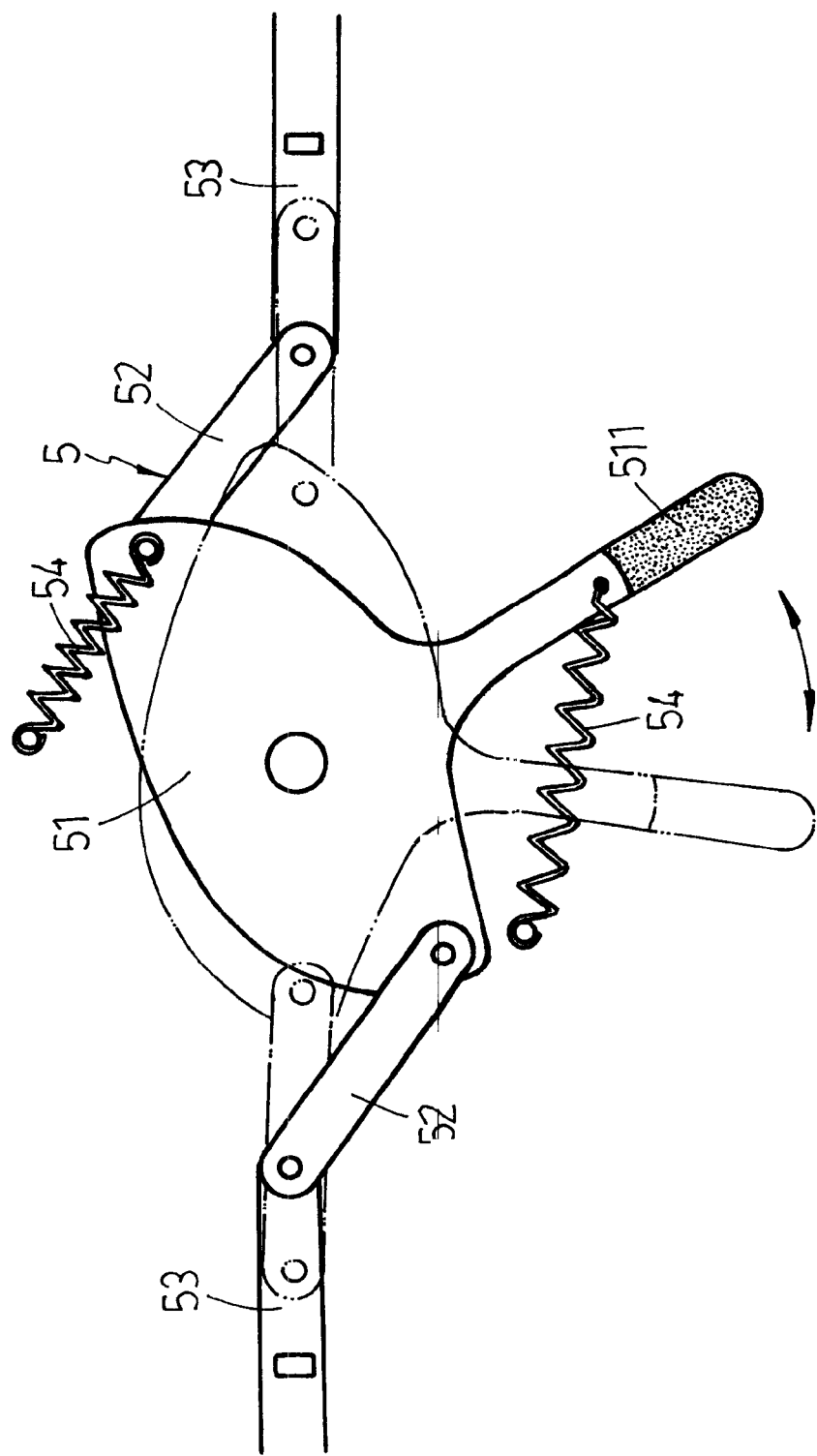
FIG. 9 is a schematic drawing showing the control device of the second embodiment of the present invention operated.

FIGS. 8 and 9 show a second embodiment of the control device according to the present invention. According to this embodiment, the control device, referenced by 5, is turned horizontally to move the two clamping plates 4 in the sliding slots 231 of the horizontal top block 23 of the base 2. The control device 5 comprises an actuating plate 51 turned about a pivot at the bottom side of the horizontal top block 23, the actuating plate 51 having a handle 511 extended out of the base 2, two springs 54 bilaterally connected between the actuating plate 51 and the base 2, two slides 53 respectively fastened to the shafts 41 of the clamping plates 4 and moved with the clamping plates 4 along the sliding slots 231, and two links 52 respectively coupled between the actuating plate 51 and the slides 53 at two sides. When turning the handle 511 rightwards, the links 52 are moved with the actuating plate 51 to pull the slides 53 toward each other, and therefore the clamping plates 4 are clamped on the bottom cuff 81 of the loaded golf bag 8. On the contrary, when turning the handle 511 leftwards, the links 52 are forced by the actuating plate 51 to move the slides 53 apart, and the space between the clamping plates 4 is relatively increased for the loading/unloading of the golf bag 8. Normally, the springs 54 hold the actuating plate 51 in such position that the clamping plates 4 are clamped on the bottom cuff 81 of the loaded golf bag 8.

Figure 10:
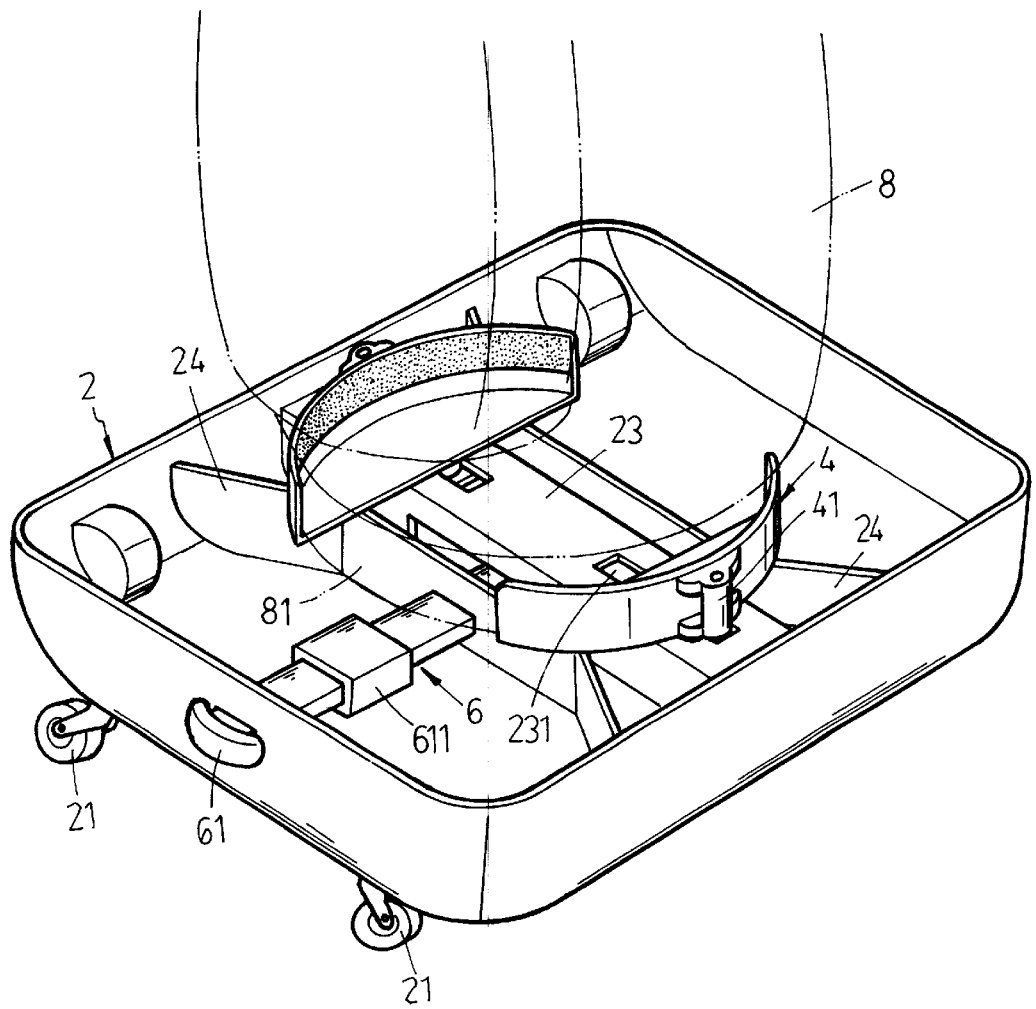
FIG. 10 is a perspective view showing the control device installed in the base according to a third embodiment of the present invention.
Figure 11:
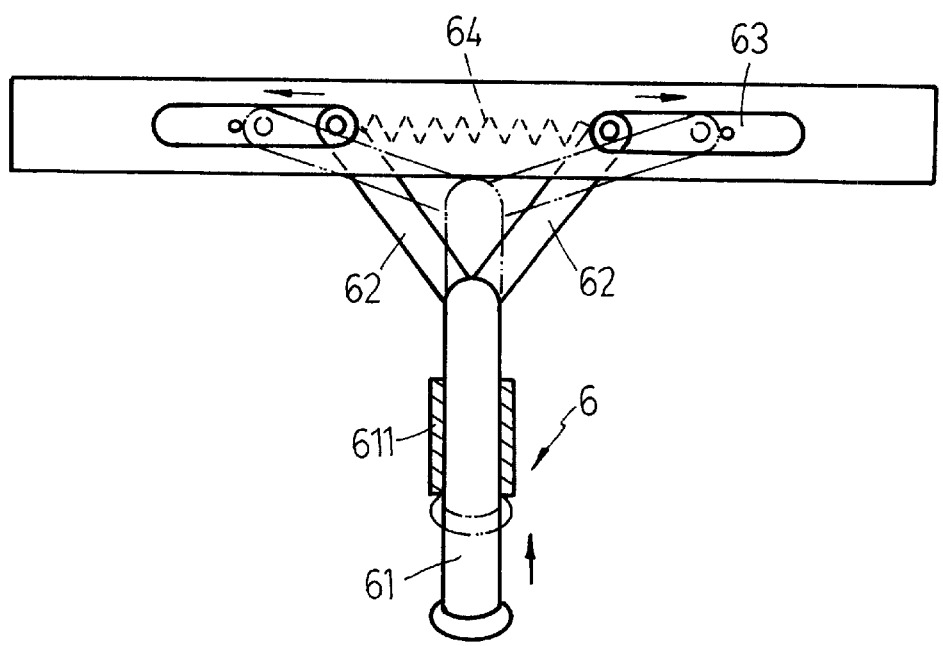
FIG. 11 is a schematic drawing showing the control device of the third embodiment of the present invention operated.

FIGS. 10 and 11 show a third embodiment of the control device according to the present invention. According to this embodiment, the control device, referenced by 6, is pulled back and forth to move the clamping plates 4 relative to each other. The control device 6 comprises a fixed barrel 611 fixedly mounted on the bottom side of the base 2, two slides 63 respectively fastened to the shafts 41 of the clamping plates 4 and moved with the clamping plates 4 along the sliding slots 231 of the horizontal top block 23, a reciprocating bar 61 inserted through the fixed barrel 611 and extended out of one side of the base 2 for operation by hand, and two links 62 respectively coupled between the reciprocating bar 61 and the slides 63. When pushing the reciprocating bar 61 inwards, the links 62 are forced to move the slides 63 apart, and therefore the distance between the clamping plates 4 is relatively increased. On the contrary, when pulling the reciprocating bar 61 outwards, the clamping plates 4 are moved toward each other to hold down the bottom cuff 81 of the loaded golf bag 8.

Figure 12:
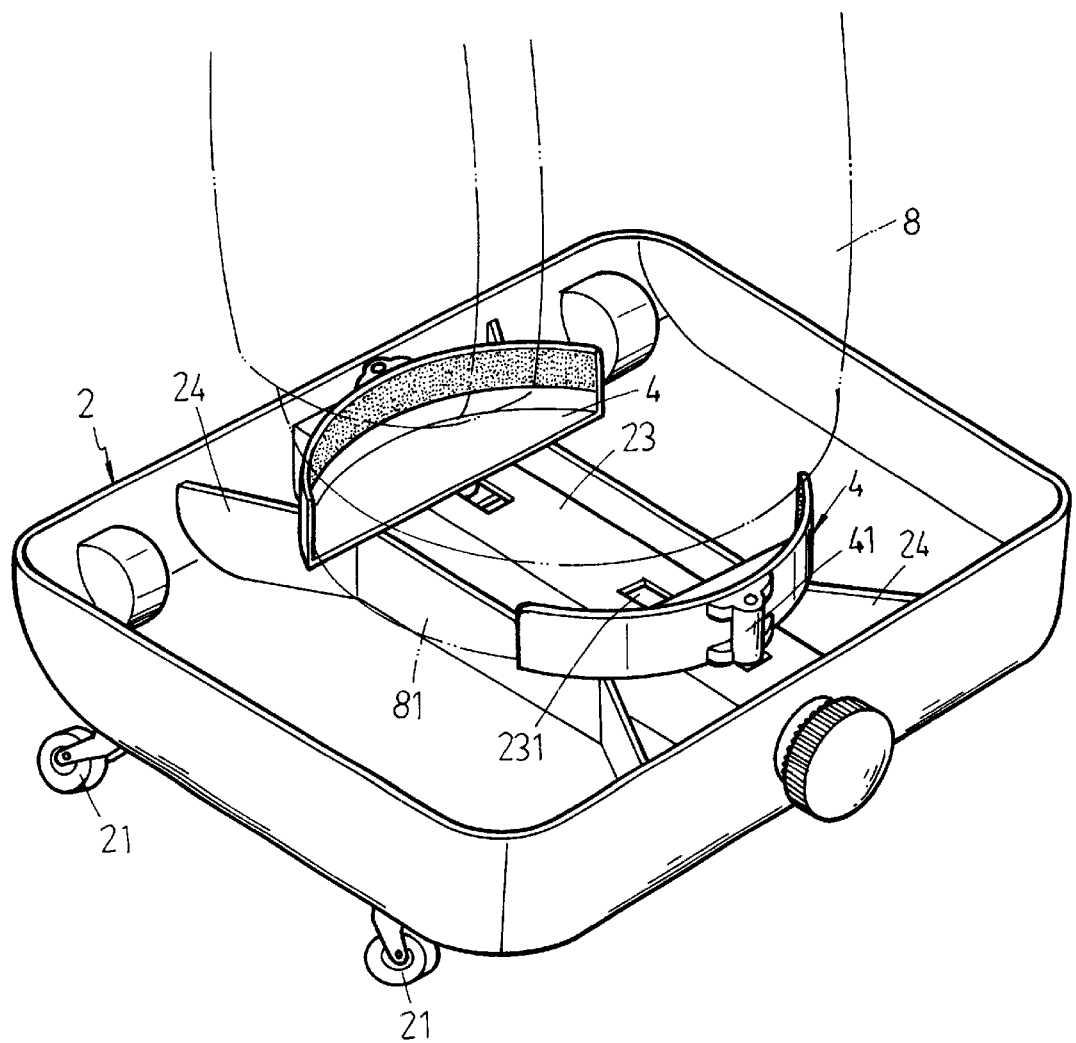
FIG. 12 is a perspective view showing the control device installed in the base according to a fourth embodiment of the present invention.
Figure 13:
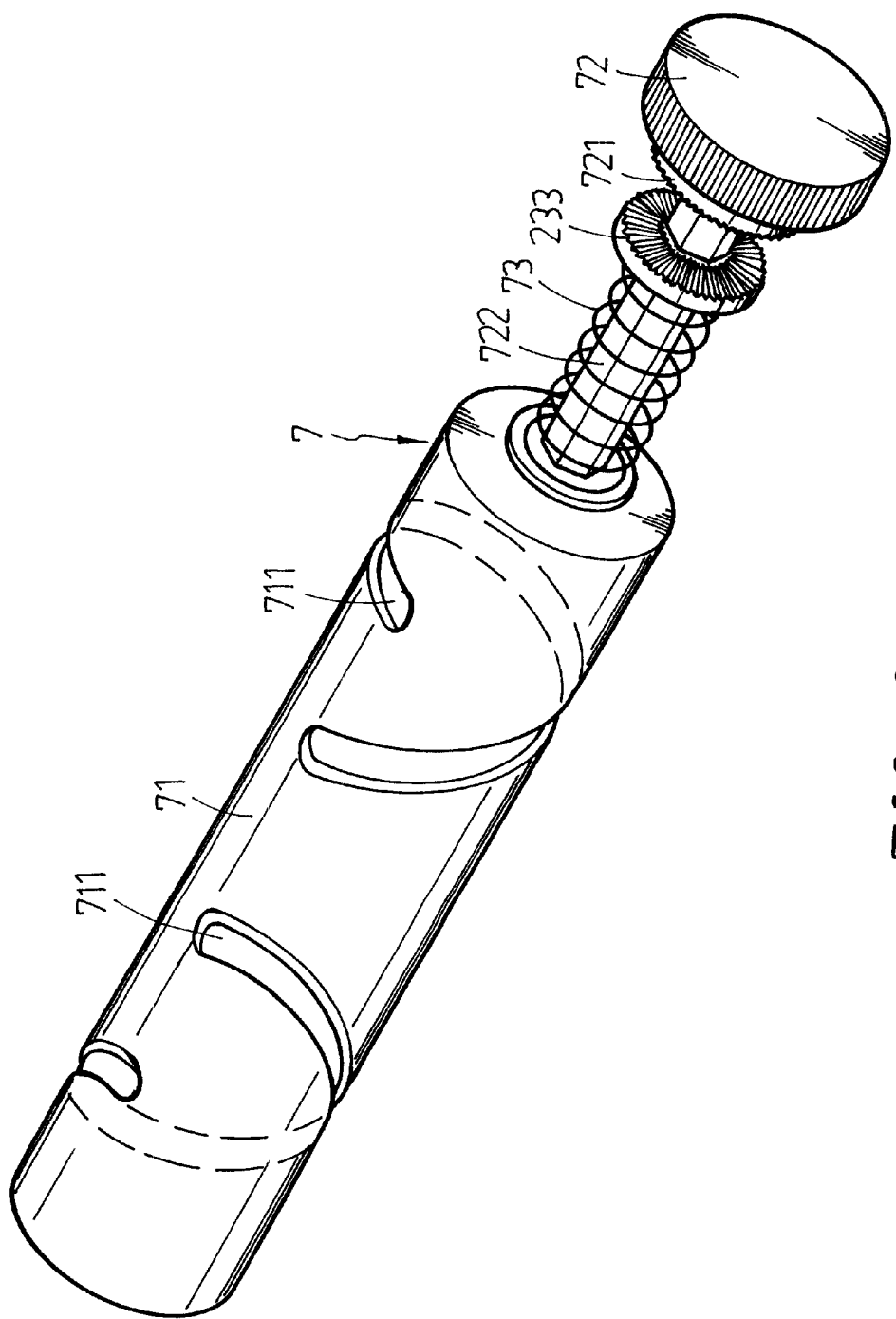
FIG. 13 is a perspective view of the control device according to the fourth embodiment of the present invention.
Figure 14:
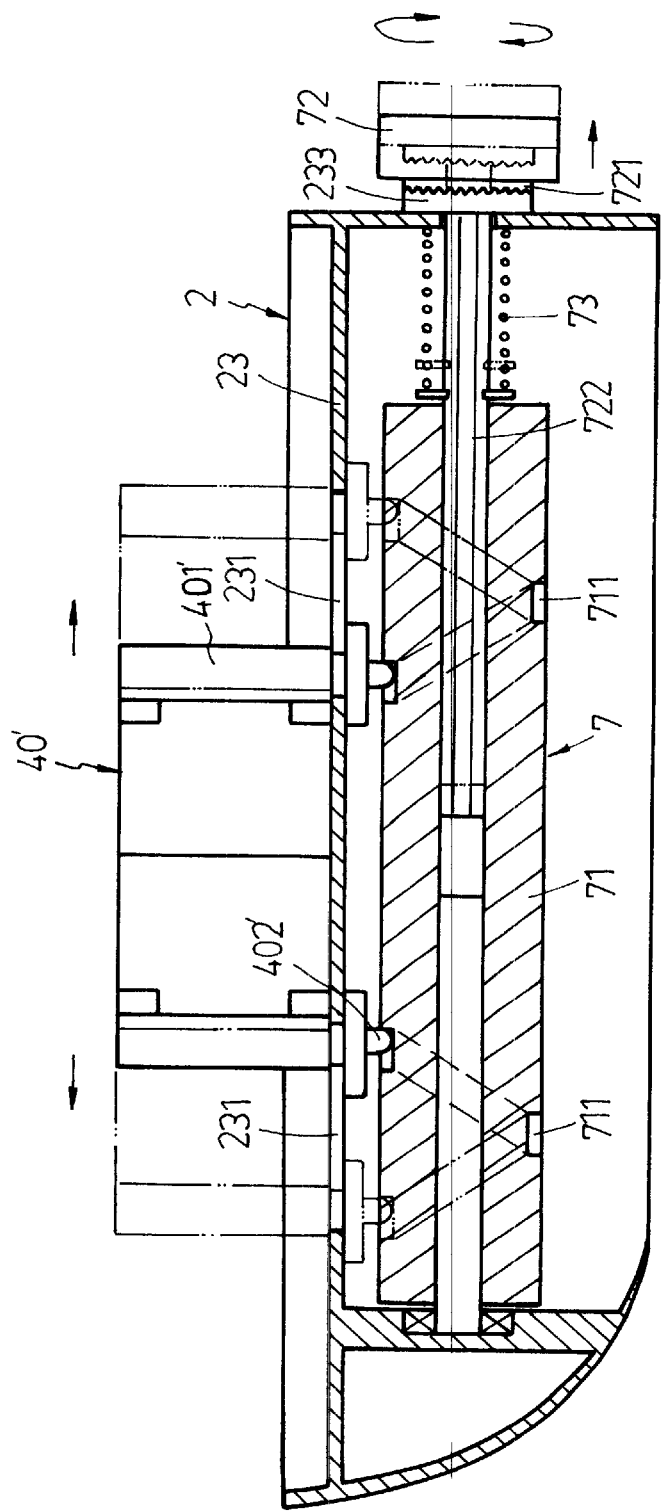
FIG. 14 is a sectional view showing the operation of the control device according to the fourth embodiment of the present invention.

FIGS. 12, 13 and 14 show a fourth embodiment of the control device according to the present invention. According to this embodiment, the control device 7 is rotated to move the clamping plates 4 relative to each other. The control device 7 comprises a cylinder 71, the cylinder 71 having an axially polygonal center hole (not shown) and two spiral sliding grooves 711 symmetrically disposed around the periphery along which the shafts 41 of the clamping plates 4 are moved respectively, a control knob 72 disposed outside the base 2, the control knob 72 having a shank 722 of polygonal cross section axially slidably fitted into the polygonal center hole of the cylinder 71, a first toothed member 233 formed integral with the base 2, a second toothed member 721 formed integral with the knob 72 and adapted for engaging the first toothed face 233, and a spring 73 mounted around the shank 722 of the knob 72. When pulling the knob 72 outwards to disengage the second toothed member 721 from the first toothed member 233, the knob 72 is turned by hand to rotate the cylinder 71 clockwise/counter-clockwise. When rotating the cylinder 71 in one direction, the clamping plates 4 are moved apart from each other for the loading of the golf bag 8. On the contrary, when rotating the cylinder 71 in the reversed direction, the clamping plates 4 are moved toward each other to hold down the bottom cuff 81 of the golf bag 8.

It is to be understood that the drawings are designed for purposes of illustration only, and are not intended for use as a definition of the limits and scope of the invention disclosed.

What the invention claimed is:

1. A golf bag carrier comprising a base equipped with four bottom wheels and two side wheels, said base comprising a horizontal top block longitudinally disposed at a top side thereof on the middle of said base for the positioning of a golf bag, said horizontal top block comprising two longitudinally aligned sliding slots, two clamping plates respectively mounted in said base and adapted to hold down a golf bag on said horizontal top block, said clamping plates each comprising a shaft respectively inserted through said sliding slots, and a control device controlled to move said clamping plates along said sliding slots relative to each other.

2. The golf bag carrier of claim 1, wherein said base further comprises two pairs of struts bilaterally symmetrically connected between two opposite vertical side walls thereof and said horizontal top block.

3. The golf bag carrier of claim 1, wherein said control device comprises spring means connected between the shafts of said clamping plates to pull said clamping plates toward each other, a transverse pivot mounted in said base, a lever turned about said transverse pivot, two actuating rods respectively coupled between the shafts of said clamping plates and one end of said lever and adapted to move said clamping plates relative to each other upon turning of said lever about said transverse pivot, a rack formed integral with said base, a spring-supported locking rod mounted in a hole on said lever and adapted for engaging said rack to lock said lever, and a knob connected to said locking rod and adapted to move said locking rod away from said rack for enabling said lever to be turned about said transverse pivot.

4. The golf bag carrier of claim 1, wherein said control device comprises an actuating plate turned about a pivot at a bottom side of said horizontal top block, said actuating plate having a handle extended out of said base for turning by hand, two springs bilaterally connected between said actuating plate and two slides on said base respectively fastened to the shafts of said clamping plates and moved with said clamping plates along the sliding slots of said horizontal top block, and two links respectively coupled between said actuating plate and said slides at two sides.

5. The golf bag carrier of claim 1, wherein said control device comprises a fixed barrel fixedly mounted in said base at a bottom side, two slides respectively fastened to the shafts of said clamping plates and moved with said clamping plates along the sliding slots of said horizontal top block, a reciprocating bar inserted through said fixed barrel and extended out of one side of said base for operation by hand, and two links respectively coupled between said reciprocating bar and said slides.

6. The golf bag carrier of claim 1, wherein said control device comprises a cylinder, said cylinder having an axially polygonal center hole, and two spiral sliding grooves symmetrically disposed around the periphery thereof along which the shafts of said clamping plates are moved respectively, a control knob disposed outside said base, said control knob having a shank of polygonal cross section axially slidably fitted into the polygonal center hole of said cylinder, a first toothed member formed integral with said base, a second toothed member formed integral with said knob and adapted for engaging said first toothed face to stop said control knob from rotary motion, and a spring mounted around the shank of said knob and adapted to hold said knob in such position that said second toothed member is meshed with said first toothed member to stop said knob from rotary motion.

* * * * *